United States Patent [19]

Lehmusto et al.

[11] Patent Number: 5,771,463
[45] Date of Patent: Jun. 23, 1998

[54] METHOD FOR CONTROLLING A SUBSCRIBER STATION IN A RADIO SYSTEM

[75] Inventors: Mika Lehmusto, Kerava; Mika Heiskari, Espoo, both of Finland

[73] Assignee: Nokia Telecommunications Oy, Espoo, Finland

[21] Appl. No.: 500,863
[22] PCT Filed: Dec. 1, 1994
[86] PCT No.: PCT/FI94/00546
  § 371 Date: Nov. 16, 1995
  § 102(e) Date: Nov. 16, 1995
[87] PCT Pub. No.: WO95/15666
  PCT Pub. Date: Jun. 8, 1995

[30] Foreign Application Priority Data

Feb. 12, 1993 [FI] Finland ................................. 935404

[51] Int. Cl.$^6$ ............................. H04B 1/00; H04B 7/00
[52] U.S. Cl. ........................................... 455/524; 455/509
[58] Field of Search .......................... 455/17, 33.1, 34.1, 455/34.2, 54.1, 54.2, 56.1, 57.1, 185.1, 186.1, 186.2, 166.1, 166.2, 517, 518, 509, 515, 67.1, 524, 8, 16

[56] References Cited

U.S. PATENT DOCUMENTS

| | | | |
|---|---|---|---|
| 4,534,061 | 8/1985 | Ulug | 455/34.2 |
| 4,540,851 | 9/1985 | Hashimoto | 340/825.73 |
| 4,716,407 | 12/1987 | Borras et al. | 455/54.2 |
| 4,982,441 | 1/1991 | Hashimoto et al. | 455/54.2 |
| 5,046,082 | 9/1991 | Zicker et al. | 379/59 |
| 5,077,828 | 12/1991 | Waldroup | 455/34 |
| 5,109,526 | 4/1992 | Reed | 455/11.1 |
| 5,423,055 | 6/1995 | Diaz et al. | 455/17 |
| 5,428,823 | 6/1995 | Ness-Cohn et al. | 455/54.2 |
| 5,515,366 | 5/1996 | Chieu et al. | 455/34.2 |

FOREIGN PATENT DOCUMENTS

| | | |
|---|---|---|
| 243899 | 11/1987 | European Pat. Off. . |
| 440284 | 8/1991 | European Pat. Off. . |
| 2176639 | 12/1986 | United Kingdom . |

Primary Examiner—Reinhard J. Eisenzopf
Assistant Examiner—Marsha D. Banks-Harold
Attorney, Agent, or Firm—IP Group of Pillsbury Madison & Sutro LLP

[57] ABSTRACT

A method for controlling a subscriber station communication on a direct mode channel in a radio system, in which at least one base station is communicating via channels, and subscriber stations. To guide a subscriber station to a desired channel at a desired moment, the radio system sends to the sub-scriber station on a direct mode channel a communication information message determining for the subscriber station the moments and the identifiers of the channels at and on which the radio system communicates with the subscriber station on the direct mode channel. The subscriber station stores the information contained in the received communication information message in its memory. The subscriber station communicating on the direct mode channel moves at the moment determined by the communication information message to the channel to be used and communicates with the radio system on that channel.

13 Claims, 2 Drawing Sheets

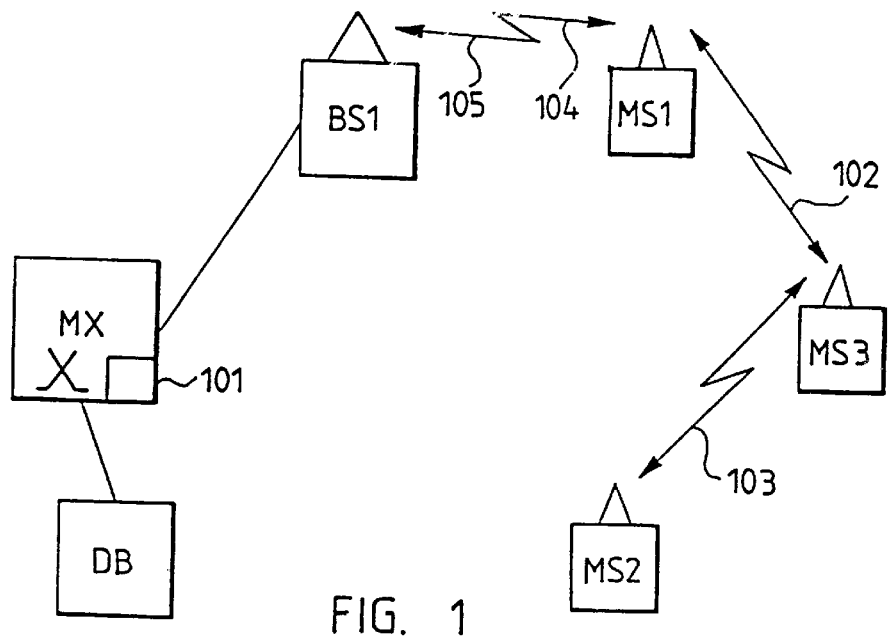
FIG. 1
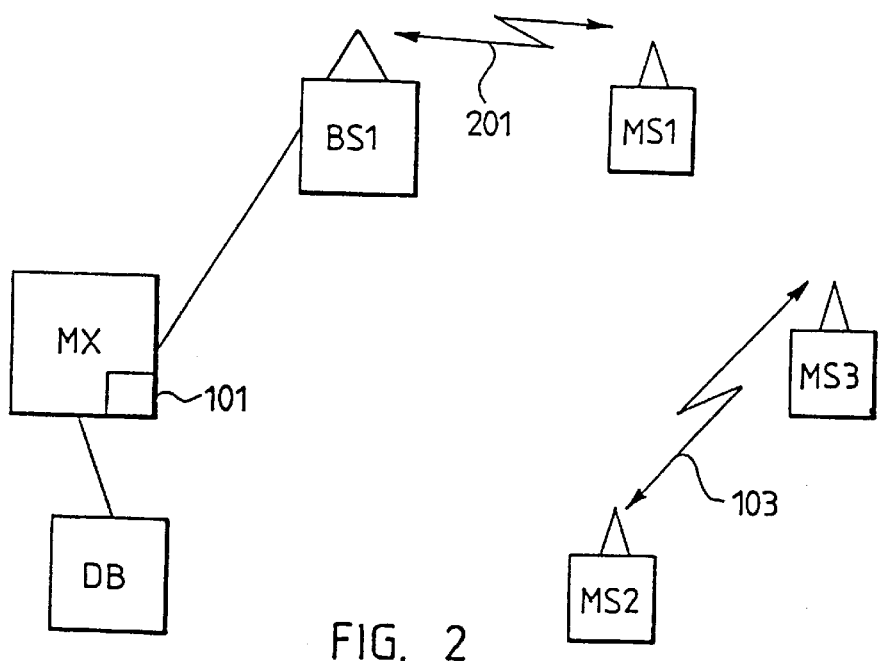
FIG. 2
| 41 | 42 | 43 | 44 | 45 | 46 | 47 |
FIG. 3

METHOD FOR CONTROLLING A SUBSCRIBER STATION IN A RADIO SYSTEM

BACKGROUND OF THE INVENTION

The invention relates to a method for controlling a subscriber station communicating on a direct mode channel in a radio system, comprising at least one base station communicating via channels, and subscriber stations as well as at least one exchange of the radio system connected to the base stations for establishing telecommunication connections between the subscriber stations.

The invention belongs to the field of trunking radio telephone systems. A trunking system is a separate radio network offering services of a company-specific radio network to several organizations by means of common use of radio channels. Trunking systems comprise control exchanges, base stations and radio telephones and have typically a cellular structure, each cell comprising one or several radio channels, one or several of the channels being used for signalling and the others as traffic channels. Call establishment, registrations, etc., take place via signalling channels. Traffic channels are used for speech transmission and switched data connections. In addition to these so-called system channels, so-called direct mode channels can be used in connection with a radio system, which channels are frequencies at which radio telephones can communicate directly with each other without involving or relying on other elements of the system.

Direct mode channels are typically used in situations when, for instance, a number of hand-held radio phones communicate with each other at such a distance from a base station that system channels cannot be used. This situation is typical for radio systems in sparsely populated regions, where a radio coverage is built for radio telephones mounted in cars and having a high transmission power. Hand-held radio telephones have a lower transmission power, due to which a signal sent by a radio phone does not carry to the base station. For economical reasons, it is generally not sensible to cover peripheral areas with a dense network of base stations offering coverage for hand-held radio phones. In operations taking place in such peripheral areas, internal communication between working teams, etc., can be made possible by means of hand-held radios by using direct mode channels.

Another important use of direct mode channels consists in increasing the capacity, when the traffic of the system increases rapidly in some part of the service area of the system, e.g. in some dot-like part. Such a need occurs typically in closed radio networks of authorities, in which it is not economically sensible to build the base station capacity so as to offer necessary channels for a special incident.

The term direct or simplex channel or simplex connection is used for a direct mode channel. A direct mode channel is a channel which is typically not used by the system at all. It is not a pair of frequencies, but only one channel of, e.g. 12.5 kHz or 25 kHz, having the breadth of the channels of the system. A sender of the radio telephones operating on a direct mode channel has tuned his or her transmitter to the channel and transmits speech or data information. The other radio telephones arranged in a state of using direct mode channels have tuned their receivers to the same channel, due to which they hear a message directly.

On a direct mode channel, it is possible to operate by analog modulation or digital modulation. A radio telephone sending on the channel can also send signalling information, such as information of access rights and priorities or of a group operating on the channel. Encryption can be realized on the direct mode channel or plain speech can be transmitted.

When a radio system according to the prior art, such as a radio telephone system, wishes to communicate with a subscriber station communicating with other subscriber stations on a direct mode channel, the radio system has no possibility of providing a communication between the particular subscriber station and the radio system. Such a communication can be, for instance, an establishment of a radio telephone connection, a call setup or, e.g., a transmission of a data message or an updating of the location of a subscriber station. In solutions according to the prior art, the only possibility of providing a communication between a subscriber station on a direct mode channel and the radio system is that the user of the subscriber station on the direct mode channel performs a so-called dualwatch operation of the user. It means that the user performs a manual change of channel at predetermined intervals, and while monitoring a transmission of a base station, the user is told by radio the moments and channels at and on which the user of the subscriber station shall tune his or her radio to monitor the transmission of the radio system, especially its base station.

A problem with such a procedure is that, when the user of a subscriber station, while communicating on a direct mode channel, wishes to receive from the radio system information of when and on which channel the radio system will send information concerning the subscriber station, the user of the subscriber station himself, or herself has to perform a manual change of channel and to monitor the transmission of the radio system as well as to remember the moments at which the radio system sends information to the subscriber station on the direct mode channel. It is natural that such a manual change of channel performed by the user himself or herself at a desired precise moment is a difficult task demanding accuracy, the success of which task may be uncertain.

Another problem with the solution according to the prior art is that, upon receipt of information of the moments and the channels at and on which the radio system may possibly transmit information or connect calls to the subscriber station, the user of the subscriber station himself or herself has to perform the monitoring of the radio system manually at those moments on the right channels. This is, of course, very laborious, because the user has to remember the necessary moments and the identifiers of the channels, to follow the time and to tune his or her radio to monitor a predetermined channel at the right moment. This has often to be performed repeatedly, which is very strenuous for the user.

A further problem with the solution of the prior art is that a subscriber station has to scan in vain the channels on which its user supposes that the radio system or its base station sends information for the subscriber station.

SUMMARY OF THE INVENTION

The object of this invention is to eliminate the problems of the solutions of the prior art, which means that the object of the invention is to provide a method and an arrangement, according to which the user of a subscriber station communicating on a direct mode channel does not need to tune his or her radio to monitor a transmission of the radio system at times, in case the radio system sends information to said subscriber station.

This novel method for controlling a subscriber station communicating on a direct mode channel in a radio system is achieved by means of the method according to the invention, which is characterized in the following method steps: the radio system sends to the subscriber station on the direct mode channel a communication information message determining for the subscriber station the moments and the identifiers of the channels at and on which the radio system communicates with the subscriber station on the direct mode channel, the subscriber station stores the information contained in said received communication information message in its memory, the subscriber station communicating on the direct mode channel moves at the moment determined by the communication information message to the channel to be used and communicates with the radio system on that channel.

The invention relates further to a radio system, comprising at least one base station, subscriber stations and an exchange of the radio system.

The radio system of the invention is characterized in that it comprises means for forming a communication information message, which tells the subscriber station the moments and the identifiers of the channels at and on which the radio system communicates with the subscriber station on the direct mode channel, and for sending the message on the direct mode channel to the desired subscriber station.

The invention relates also to a subscriber station of a radio system, comprising: a memory means, a transceiver, a user interface and a controller for controlling the operation of the subscriber station.

The subscriber station of the invention is characterized in that the memory means is arranged to store the information contained in a communication information message received by the subscriber station of the moments and the channels at and on which the radio system communicates with the subscriber station on the direct mode channel and that the subscriber station further comprises means for tuning the transceiver of the subscriber station, under forced control or controlled by the user, to communicate with the radio system at the moment and on the channel indicated by the communication information message.

The invention is based on the idea that a radio telephone system informs by means of a communication information message a radio communicating on a direct mode channel, i.e. a subscriber station, of the moments and channels at and on which information may be sent to the subscriber station. Then the subscriber station may change over automatically to monitor a transmission of the radio telephone system, typically its base station, for a short time at these moments determined by the communication information message.

An advantage of such a method for controlling a subscriber station communicating on a direct mode channel in a radio system, the radio system and the subscriber station is that, through implementing the method of the invention, the subscriber station communicating on the direct mode channel can be offered the services of the whole radio system, if needed, because according to the invention, the subscriber station communicating on the direct mode channel will be capable of monitoring the signalling of the radio system and of receiving information sent by the radio system, if the subscriber station is within the coverage area of a base station.

An advantage of the invention is that the subscriber station can change-over automatically to monitor a desired channel of the radio system at desired moments, because the radio system sends a communication information message and the content of that message is stored in a memory of the subscriber station. Then the user of the subscriber station does not necessarily need to make any decision or to perform any operation, for the subscriber station functions automatically in such a way that the radio unit of the subscriber station begins to monitor the desired channel of the radio system at the desired moment.

Another advantage of the invention is that the subscriber station can actually monitor the transmission of the radio system only when the radio system is sending information to that specific subscriber station, because the subscriber station knows according to the invention when it shall monitor the transmission of the radio system. Then the arrival of the information sent by the radio system to the subscriber station is safer than in arrangements according to the prior art. According to that fact, the subscriber station wishing to receive information from the radio system has to monitor messages of the radio system only when the radio system actually sends information to that subscriber station. The communication of the subscriber station on the direct mode channel will then be disturbed less, since it is enough that the subscriber station monitors the transmission of the radio system only when the radio system is actually sending to that subscriber station.

A further advantage of the invention is that it is easier for the subscriber station to find the information meant therefor, because the subscriber station knows when and on which channel that information is sent. The advantage of the invention is thus that the subscriber station does not need to search in vain for the information to be sent thereto.

BRIEF DESCRIPTION OF THE DRAWINGS

The invention will be described in more detail in the following with reference to the attached drawings, in which:

FIG. 1 shows a functional block diagram of an arrangement according to the invention in a situation when a communication information message is sent to a subscriber station communicating on a direct mode channel, FIG. 2 shows a functional block diagram of the arrangement according to the invention in a situation when the subscriber station having received the communication information message begins to communicate with a radio system, FIG. 3 shows a block diagram of the communication information message according to the invention.

DETAILED DESCRIPTION

Figure 4:
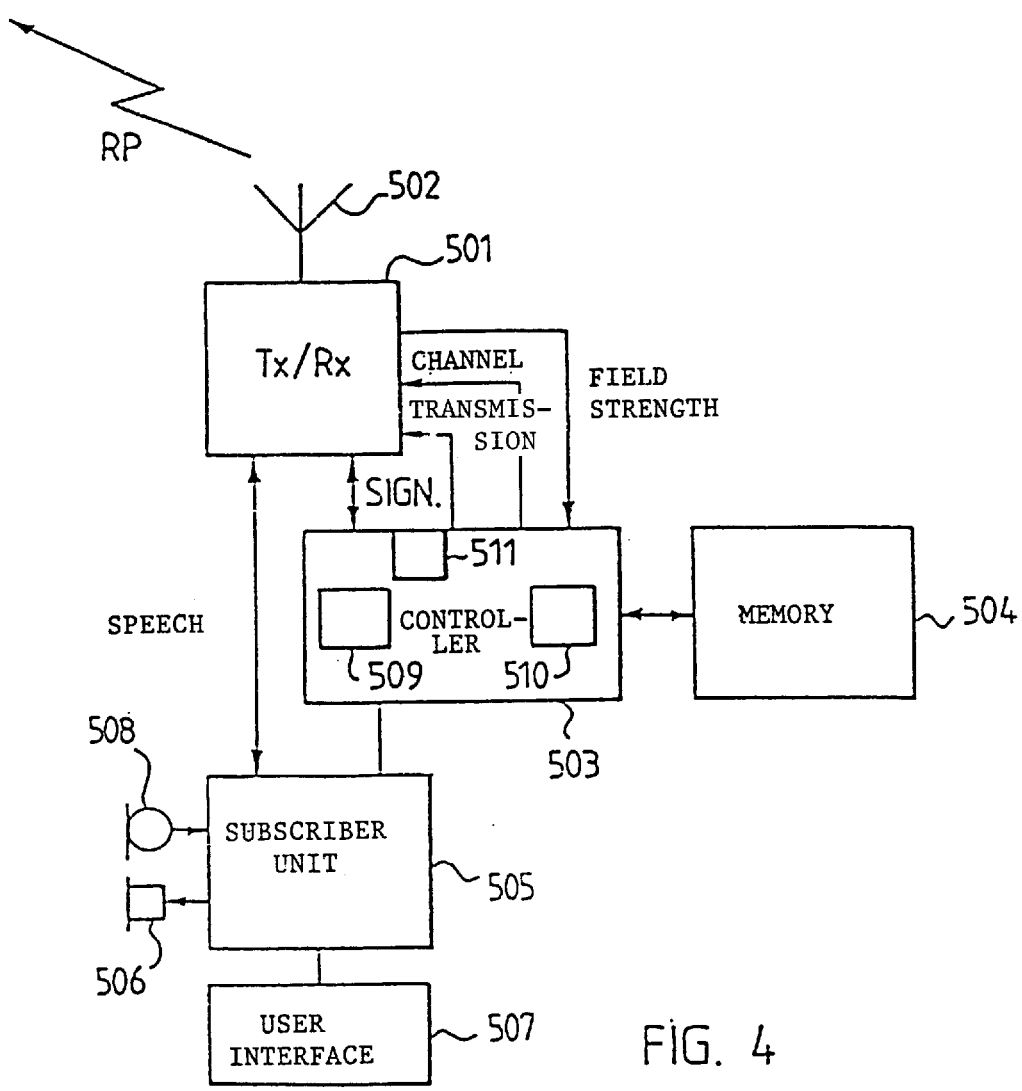
FIG. 4 shows a block diagram of the subscriber station according to the invention.

FIG. 1 shows a functional block diagram of an arrangement according to the invention in a situation when a radio system, typically by its base station BS1, sends a communication information message 104 (FIG. 3) to a subscriber station MS1 communicating with other subscriber stations MS2, MS3 on a direct mode channel 102, 103. By means of the communication information message 104 (FIG. 3), the radio system tells the subscriber station MS1 communicating on the direct mode channel at least the moments and the channels at and on which the radio system tries to send some information to that subscriber station. This information may be, for instance, an incoming call, an ongoing call, a signalling message, a data message or some other message. Sending that communication information message and other communication between the radio system and the subscriber station occur generally via the base station BS1. It is also possible that there is a repeater station between the base station and the subscriber stations, which repeater station is capable of communicating, e.g. with the base station of the radio system and the subscriber stations on the direct mode channel. The communication information message 104 is typically sent by an exchange of the radio system, the exchange comprising means 101 for forming the communication information message, which tells the subscriber station the moments and the identifiers of the channels at and on which the radio system communicates with the subscriber station on the direct mode channel, and for sending the communication information message on the direct mode channel to the desired subscriber station. These means 101 are typically realized in the exchange of the radio system, but they can also be realized somewhere else in that radio system. The means 101 may have been realized for instance in a control part of the exchange, e.g. by software. The communication information message 104 (FIG. 3) can be sent to the subscriber station MS1 when there is no other traffic on that direct mode channel. On the other hand, the communication information message can be sent on the direct mode channel to the subscriber station MS1 simultaneously with other traffic on the direct mode channel. Upon receipt of the communication information message 104, the subscriber station MS1 sends an acknowledgement message 105 to the radio system (MX, BS1).

The radio system according to the invention may further comprise a database DB maintaining information of on which direct mode channel each subscriber station MS1, MS2, MS3 communicates. On the basis of that information, a communication information message 104 is sent through the desired direct mode channel to the subscriber station MS1, for instance. The radio system is capable of reading from the database DB an information of on which direct mode channel the subscriber station is communicating to which the communication information message shall be sent. Further, the database DB may contain information of through which base station it is worth while sending information to said subscriber station MS1. The use of database makes the sending of the communication information message especially efficient, because the communication information message can be sent directly to the right subscriber station on the direct mode channel or on another channel monitored by that subscriber station. Then it is not necessary to page subscribers in vain and the communication information message must be sent only from those base stations and on those channels possibly monitored by the respective subscriber station.

FIG. 2 shows a functional block diagram of an arrangement according to the invention in a situation when a subscriber station MS1 having received a communication information message 104 (FIG. 1) has begun to communicate with a radio system. Upon receipt of the communication information message, the subscriber station MS1 stores the content of the information of on which channel and when the subscriber station shall communicate with the radio system. Subsequently, the subscriber station follows the time passing and tunes its radio unit at the right moment to the channel indicated by the communication information message. Then the subscriber station MS1 communicates with the radio system on a channel 201, which may be some traffic or control channel of a base station or even a direct mode station, if there is a repeater station between the base station of the radio system and the subscriber station. Simultaneously, the other subscriber stations MS2, MS3 communicate with each other on a direct mode channel 103.

FIG. 3 illustrates a block structure of a communication information message. Block 41 of the communication information message comprises a specific identifier of the message, the identifier telling the receiver that the message in question is a communication information message. Block 42 comprises identifiers of a receiver or a group of receivers or several receivers of the message. Block 43 comprises an identifier of that base station through which the subscriber stations receiving the communication information message are desired to communicate with the radio system. Block 44 comprises priority information of the communication information message, telling the importance of the desired establishment of connection, i.e. communication, intended by the communication information message. The priority 44 contained in the communication information message (FIG. 3) received by the subscriber station is compared with the priority of a call in which the subscriber station has participated on the direct mode channel. If the priority 44 contained in the communication information message is higher than the priority of the call in which the subscriber station has participated on the direct mode channel, the transceiver of the subscriber station is tuned under forced control to communicate with the radio system during the time and on the channel indicated by the communication information message. Then a telephone connection or a short message connection, for instance, can be established with the subscriber station. In addition, the communication information message (FIG. 3) may comprise a field 45, which is an identifier of the service said communication information message concerns. Communication information messages and requests or commands for an establishment of connection contained therein may actually concern only some predetermined service, e.g. only speech connection service or short message service or some other combination of services. The communication information message may also comprise other fields 46, e.g. an information of when the subscriber station having received the communication information message shall monitor a transmission of the radio system. The information may be, for instance, the time after which a change of channel shall take place. This information may also be some other time definition, an accurate time by the clock, for instance. It shall be noted that these times may be more than one. Block 47 may be an identifier of the channel through which the subscriber station is desired to communicate with the radio system.

FIG. 4 shows a block diagram of a subscriber station according to the invention. The figure illustrates a typical subscriber station, i.e. the structure of a radio telephone used by the subscriber. The purpose of a transceiver (TX/RX) 501 is to be applied to a radio channel used each time. The radio channel may be a traffic or control channel of a base station of a radio system or a direct mode channel. To the transceiver 501 is connected an antenna 502, which is in contact with a radio path RP. Radio frequencies between 60 and 1000 MHz (VHF and UHF ranges) are used in general. Also other frequencies are possible. Analog modulation can be used on the radio path RP, the method of modulation usually being phase modulation. Also other methods of modulation can be used. For a transfer of signalling, e.g. common channel signalling, a subcarrier (FFSK) at voice frequency can be used, for instance. The transfer of the radio path may also be digital.

A subscriber unit 505 may comprise electroacoustic converting means, typically a phone handle 506 and a microphone 508, and possibly key pads on a user interface 507, for starting and terminating and selecting a call. Since a call on the radio path RP of a trunking system is preferably simplex, the subscriber unit in most cases also comprises a speech key to be pressed during speaking. However, the traffic can also be duplex traffic.

The purpose of a controller 503 is to control the operation of a subscriber station. The controller 503 is connected to the subscriber unit 505, from which it receives commands for starting and terminating a call, for instance. Through the subscriber unit 505 or the user interface 507, the controller 503 may also give the user acoustic or visual signals relating to the operation of the radio telephone and/or the radio telephone system.

The controller 503 is connected to the transceiver TX/RX 501. The channel used by the transceiver is determined by the controller 503, which means that the transceiver 501 is tuned to the channel, i.e. radio frequency, determined by the controller 503. The transceiver 501 is also switched on under control of the controller 503. The controller 503 receives and transmits signalling messages, i.e. call messages, through the transceiver 501.

To the controller 503 is connected a memory means 504 comprising fixed data and variable data. Fixed data are for instance the individual subscriber number of a subscriber station, the numbers of the groups to which the subscriber station belongs and the radio channels belonging to the system. Variable data are an instantaneous state of the subscriber station, e.g. an idle state, a state of call establishment, a call state, etc., as well as, e.g., an information of to which channel the station is tuned. The memory means 504 of the subscriber station according to the invention is arranged to store the information contained in the communication information message 104 (FIG. 3) received by the subscriber station of those moments 47 and those channels 43 or base stations at and on and in which the radio system communicates with the subscriber station on the direct mode channel. That communication information message may also contain other information to be stored in the memory means 504. Examples of this information will be set forth in connection with the description of FIG. 3.

Further, the subscriber station shown in FIG. 4 comprises means 509 for tuning the transceiver 501 of the subscriber station, under forced control or controlled by the user, to communicate with the radio system at the moment and on the channel indicated by the communication information message. It has been possible to arrange these means in the control part 503 of the radio unit or they may be somewhere else in the radio unit.

The subscriber station shown in FIG. 4 additionally comprises means 510 for comparing the priority 44 contained in the communication information message (FIG. 3) received by the subscriber station with the priority of the call in which the subscriber station has participated on the direct mode channel, and for tuning the transceiver 501 of the subscriber station under forced control to communicate with the radio system at the moment and on the channel indicated by the communication information message, in case the priority of the communication message is higher than the priority of the call in which the subscriber station has participated on the direct mode channel. It has been possible to arrange these means in the control part 503 of the radio unit or they can be somewhere else in the radio unit.

The drawings and the description relating to them are only intended to illustrate the idea of the invention. As to the details, the method according to the invention for controlling a subscriber station communicating on a direct mode channel in a radio system, the radio system and the subscriber station may vary within the scope of the claims. Even if the invention is described above mainly in connection with trunking radio systems, the invention can also be used in connection with other kinds of radio systems, such as conventional mobile telephone systems.

We claim:

1. A method for controlling a subscriber station communicating on a direct mode channel in a radio system, comprising at least one base station communicating via channels and subscriber stations as well as at least one exchange of the radio system connected to the base stations for establishing telecommunication connections between the subscriber stations, wherein the radio system sends to the subscriber station on the direct mode channel a communication information message determining for the subscriber station on the direct mode channel the moments and the identifiers of the channels at and on which the radio system communicates with the subscriber station, said subscriber station stores the information contained in said received communication information message in its memory, the subscriber station communicating on the direct mode channel moves at said moment determined by the communication information message to said channel to be used and communicates with the radio system on said channel.

2. A method according to claim 1, wherein said radio telephone system maintains a database, in which are stored information of on which direct mode channel and/or within the coverage area of which base station each subscriber on direct mode channels is communicating, and the radio telephone system utilizes this information when sending said communication information message.

3. A method according to claim 1, wherein said communication information message is sent to said subscriber station when there is no other traffic on said direct mode channel.

4. A method according to claim 1, wherein said communication information message is sent on the direct mode channel to said subscriber station simultaneously with other traffic on the direct mode channel.

5. A method according to claim 1, wherein the subscriber station sends an acknowledgement message to the radio system upon receipt of said communication information message.

6. A method according to claim 1, wherein said communication information message contains its own identifier, information of a desired receiver or receivers as well as an identifier of the base station and/or an identifier of the channel through which the radio system will later communicate with the subscriber station.

7. A method according to claim 6, wherein said communication information message further contains a priority information telling the importance of a connection to be established between the radio system and the subscriber station in relation to the earlier connections of the subscriber station.

8. A method according to claim 7, wherein said communication information message also contains an identifier of the service said communication information message concerns.

9. A method according to claim 6, wherein said communication information message also contains an identifier of the service said communication information message concerns.

10. A radio system, comprising:

at least one base station, subscriber stations connected to base stations by radio, at least one exchange of the radio system, connected to the base stations, for establishing telecommunication connections between the subscriber stations, communication means for forming a communication information message, which tells the subscriber station on the direct mode channel the moments and the identifiers of the channels at and on which the radio system communicates with the subscriber station, and for sending said message on the direct mode channel to the desired subscriber station.

11. A radio system according to claim 10, wherein the system further comprises a database maintaining information of on which direct mode channel and/or within the coverage area of which base station each subscriber station on the direct mode channel is communicating and on the basis of which information a communication information message is sent to said subscriber station through a desired direct mode channel.

12. A subscriber station of a radio system, comprising:

a transceiver, a user interface, a controller for controlling the operation of the subscriber station, a memory means arranged to store the information contained in a communication information message received by the subscriber station on the direct mode channel of the moments and the channels at and on which the radio system communicates with the subscriber station, and control means for tuning the transceiver of the subscriber station, under forced control or controlled by the user, to communicate with the radio system at the moment and on the channel indicated by the communication information message.

13. A subscriber station according to claim 12, wherein the subscriber station further comprises comparing means for comparing a priority contained in the communication information message received by the subscriber station with the priority of the call in which the subscriber station has participated on a direct mode channel and for tuning the transceiver of the subscriber station under forced control to communicate with the radio system at the moment and on the channel indicated by said communication information message, in case the priority contained in the communication information message is higher than the priority of the call in which the subscriber station has participated on the direct mode channel.

* * * * *